I. J. GALLIA.
DIRECTION INDICATOR.
APPLICATION FILED FEB. 23, 1915.
1,202,702.
Patented Oct. 24, 1916.
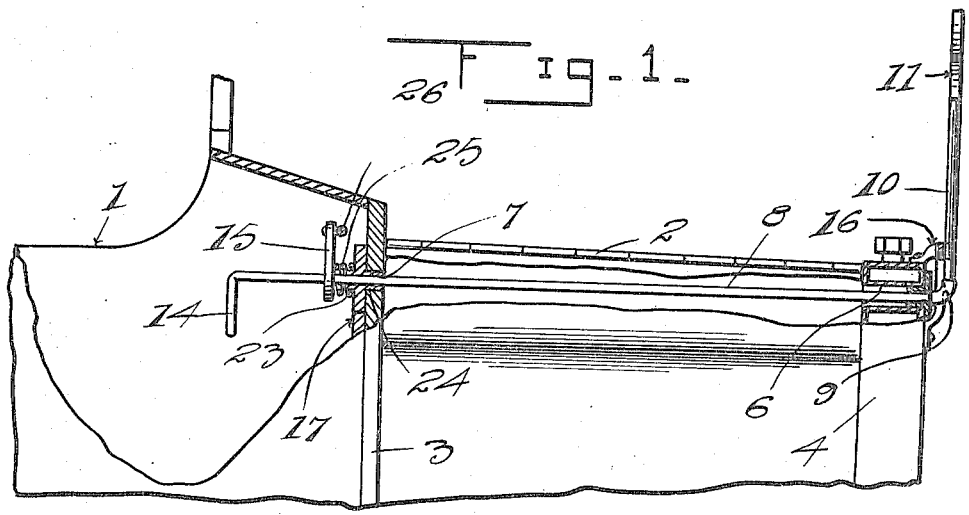
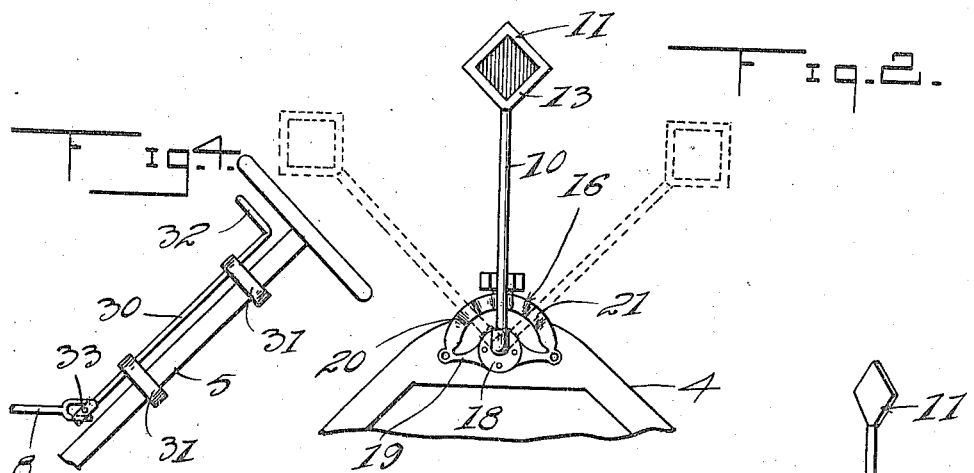
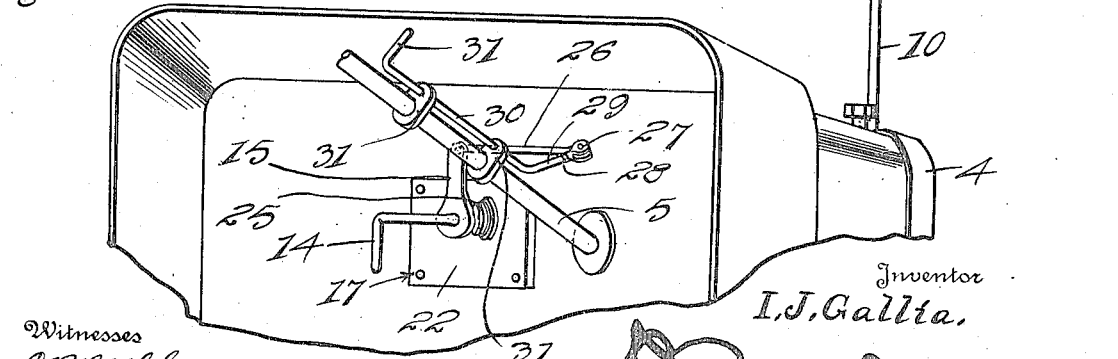
Inventor
I. J. Gallia.

UNITED STATES PATENT OFFICE.

IGNATZ J. GALLIA, OF HOUSTON, TEXAS.

DIRECTION-INDICATOR.

1,202,702. Specification of Letters Patent. Patented Oct. 24, 1916.

Application filed February 23, 1915. Serial No. 10,030.

*To all whom it may concern:*

Be it known that I, IGNATZ J. GALLIA, citizen of the United States of America, residing at Houston, in the county of Harris and State of Texas, have invented certain new and useful Improvements in Direction-Indicators; and I do hereby declare the following to be a full, clear, and exact description of the invention, such as will enable others skilled in the art to which it appertains to make and use the same.

This invention relates to new and useful improvements in direction indicators, and has for its principal object to provide a simple and efficient indicator which may be operated from the driver's seat of a vehicle, and which will indicate to pedestrians and other vehicles the direction to be taken.

Another object of the invention is to provide a novel indicator which is so arranged that it may be operated from the steering post or by the knees of the vehicle operator.

A further object of the invention is to provide a device which may be locked in any of its indicating positions, and which may also be locked in its neutral position.

Still another and more specific object of the invention is to provide a novel form of controller for the indicator.

With these and other objects in view, the invention consists in the novel combination and arrangement of parts which will be fully set forth in the following specification and accompanying drawings, in which—

Figure 1 is a fragmentary side view of the vehicle showing my improved indicator applied thereto, Fig. 2 is a front fragmentary elevation of the radiator showing the indicator in place, Fig. 3 is a fragmentary perspective view of the dash board showing the operating mechanism, and Fig. 4 is a view of a modified form of operating mechanism.

Referring to the drawings by characters of reference, the numeral 1 designates as an entirety a motor vehicle of the usual construction provided with the usual hood 2 and dash board 3. This vehicle also carries the usual radiator 4 and secured to the dash in the usual way is the steering column 5.

The radiator and dash board 4 and 3 respectively are formed with apertures 6 and 7 for the reception of the shaft 8 of the signaling device. This shaft 8 is provided at its forward end with suitable screw threads on which the elbow 9 is threaded, and this elbow is arranged so as to extend vertically as shown, and carries the arm 10, on the upper end of which is the signal 11. This signal is preferably provided with the red field 12 and white border 13 so as to render the same easily seen and is arranged to be swung into the dotted line positions illustrated in Fig. 2. The rear end of the shaft 8 terminates in the downward extending portion 14 which is designed to form a means by which the device may be operated by the knees of the driver of the vehicle. Secured near the rear end 14 is a suitable upwardly extending crank arm 15, the use of which will appear as the description proceeds.

In order to form bearings for the shaft in the apertures 6 and 7, there are provided the plates designated generally by the numerals 16 and 17, which plates are respectively for the apertures 6 and 7 as clearly illustrated in the drawings.

The plate 16 hereinbefore referred to comprises the body 18 having formed thereon the radially extending arms 19 which in the form shown are three in number and carry at their outer ends the arcuate guide 20 which is provided with suitable notches 21 in which the rod 10 seats when in any of its indicated positions. The plate 17 hereinbefore referred to, comprises the body 22 which is provided with a central aperture, which aperture is surrounded by the oppositely extending collars 23 and 24. These collars form bearings for the shaft 8 and the collar 23 acts as a guide for the coil spring 25, which abuts the plate at one end and at its opposite end abuts the crank arm 15.

In order that the device may be operated from the steering wheel, the link 26 is pivoted to the upper end of the crank arm 15 and the opposite end of the link is pivoted in the forked member 27 which is pivotally secured as at 28 to the arm 29 of the shaft 30, which is journaled in the bearings 31, which bearings surround the shaft and the steering column 5 to support the shaft in place. The upper end of the shaft terminates in the angular extension 32 which forms a hand hold or gripping member by which the device may be operated.

It will be apparent from the foregoing that in use when the driver of the vehicle desires to go directly forward the indicator stands in the position illustrated in Fig. 2 by the full lines. In event he is to round a corner, the handle 32 is turned to either the right or left, according to the direction to be taken, and it will be evident that the angular extension 29 will cause the link to move the crank arm 15, thereby rotating the shaft and moving the arm 10 and indicator 11 to the desired position. It will thus be seen that a signal is given both to pedestrians and other vehicles as to the direction to be taken, and many of the accidents due to confusion of signals will be eliminated.

In event the steering wheel is located in the center of the vehicle, the mechanism illustrated in Fig. 4 is provided and the crank arm 15 eliminated and the rod 8 extended and provided with a universal connection 33. This mechanism is operated in essentially the same manner as hereinbefore described.

While in the foregoing there has been shown and described the preferred embodiment of this invention, it is to be understood that such changes may be made in the combination and arrangement of parts as will fall within the spirit and scope of the invention as defined in the claim.

What is claimed is:

The combination with a vehicle having a steering column, a dash board, a radiator, and a hood between the dash board and radiator, of a shaft rotatably mounted between the dash board and the radiator beneath the hood and extending through the dash board and radiator, an indicator carried by the forward end of the shaft, a crank arm carried by the rear end of the shaft, a locking plate secured to the radiator and engaging the indicator to hold the same in its adjusted position, a coil spring surrounding the shaft and causing the indicator to bear against the locking plate, a controlling shaft rotatable on the steering column, a crank on said shaft, a link connecting the crank and the crank arm, a handle on the controlling shaft and a handle on the inner end of the shaft.

In testimony whereof I affix my signature in presence of two witnesses.

IGNATZ J. GALLIA.

Witnesses:
M. McDONALD,
G. E. IRONS.

Copies of this patent may be obtained for five cents each, by addressing the "Commissioner of Patents, Washington, D. C."